United States Patent
Frick et al.

(10) Patent No.: US 10,627,482 B2
(45) Date of Patent: Apr. 21, 2020

(54) APPARATUS AND METHOD OF QUADRATURE DETECTION USING ONE MIXER WITHOUT OVERSAMPLING IN A RECEIVER

(71) Applicant: Honeywell International Inc., Morris Plains, NJ (US)

(72) Inventors: Seth T. Frick, Saint Paul, MN (US); Benjamin J. Winstead, Minneapolis, MN (US)

(73) Assignee: Honeywell International Inc., Morris Plains, NJ (US)

(*) Notice: Subject to any disclaimer, the term of this patent is extended or adjusted under 35 U.S.C. 154(b) by 284 days.

(21) Appl. No.: 15/634,056

(22) Filed: Jun. 27, 2017

(65) Prior Publication Data

US 2018/0372839 A1  Dec. 27, 2018

(51) Int. Cl.
| | |
|---|---|
| *G01S 7/35* | (2006.01) |
| *G01S 13/34* | (2006.01) |
| *G01S 13/02* | (2006.01) |
| *G01S 13/88* | (2006.01) |

(52) U.S. Cl.
CPC .......... *G01S 7/352* (2013.01); *G01S 13/0209* (2013.01); *G01S 13/343* (2013.01); *G01S 13/882* (2013.01); *G01S 2007/358* (2013.01)

(58) Field of Classification Search
None
See application file for complete search history.

(56) References Cited

U.S. PATENT DOCUMENTS

| | | | |
|---|---|---|---|
| 4,248,196 A * | 2/1981 | Toelle | F02D 41/1491 123/680 |
| 7,190,939 B2 | 3/2007 | Son et al. | |
| 7,199,713 B2 | 4/2007 | Barink et al. | |
| 2006/0293018 A1* | 12/2006 | Reynolds | G06K 7/0008 455/324 |

(Continued)

FOREIGN PATENT DOCUMENTS

| | | |
|---|---|---|
| CN | 106357281 A | 1/2017 |
| EP | 2631666 A1 | 8/2013 |

OTHER PUBLICATIONS

"Image Rejection Mixers"; Microwaves101; Available: https://www.microwaves101.com/encyclopedias/image-rejection-mixers; Accessed Jan. 4, 2019.

(Continued)

*Primary Examiner* — Whitney Moore
(74) *Attorney, Agent, or Firm* — Fogg & Powers LLC

(57) ABSTRACT

Apparatus and methods of determining altitude information with a radar receiver with quadrature detection is provided. A method includes generating baseband frames. An oscillator signal is created within each of the baseband frames. A return of the oscillator signal is coupled to a first input of a mixer. Moreover, the oscillator signal is coupled to a second input of the mixer. A phase of the oscillator signal is selectively changed between two or more distinct values. Timing of the change being based at least in part on a baseband frame timing of the generated baseband frames. Samples of an output of the mixer are selectively collected further based at least in part on the baseband frame timing. The collected samples are processed to compute altitude information.

19 Claims, 10 Drawing Sheets

(56) References Cited

U.S. PATENT DOCUMENTS

| | | | |
|---|---|---|---|
| 2013/0214963 A1* | 8/2013 | Vacanti | G01S 7/038 |
| | | | 342/120 |
| 2014/0316771 A1* | 10/2014 | Short | G10L 21/0272 |
| | | | 704/201 |
| 2015/0156003 A1 | 6/2015 | Khandani | |
| 2015/0378017 A1 | 12/2015 | Ferguson et al. | |
| 2016/0293018 A1 | 10/2016 | Kim et al. | |

OTHER PUBLICATIONS

European Patent Office; "Extended European Search Report from EP Application No. 18178667.4, dated Nov. 26, 2018"; from Foreign Counterpart of U.S. Appl. No. 15/634,056; pp. 1-15; dated Nov. 26, 2018; Published: EP.

Henderson, Bert C., et al. "Image-Reject and Single-Sideband Mixers"; WJ Communications, Inc.; vol. 12 No. 3; May/Jun. 1985; pp. 1-6.

Ziomek, C., et al., "Digital I/Q Demodulator"; IEEE 1996; pp. 2663-2665; Published: US.

\* cited by examiner

APPARATUS AND METHOD OF QUADRATURE DETECTION USING ONE MIXER WITHOUT OVERSAMPLING IN A RECEIVER

BACKGROUND

In many radio and radar systems, the signals of interest will occupy only one sideband of the carrier frequency, while the other sideband contains unwanted signals such as interference, clutter, and noise. Even in systems which utilize both sidebands of the carrier for the desired signals, there may be a need to discriminate signals between the two sidebands. In either of these cases, the receiver must be capable of unambiguously resolving signal components which reside in the upper and lower sidebands of the carrier. To do this, the receiver must sample the intermediate frequency (IF) or baseband signal to produce both in-phase (I) and quadrature (Q) components. If the signal is sampled with only one phase (yielding a set of real-valued rather than complex-valued samples), then the measured IF or baseband spectrum will consist of one sideband superimposed with the mirror image of the other sideband, reflected across $f_{IF}$.

Obtaining both I and Q samples in the receiver traditionally requires an analog I/Q architecture, consisting of two full signal chains, including two mixers, two sets of filtering and amplification stages, and two analog-to-digital converters (ADCs) for each receiver channel. An alternative is direct IF sampling which uses only one signal chain (one mixer, one set of filter/amp. stages, one ADC) per channel, but requires a higher performance ADC and involves some digital signal processing to be performed in order to recover the I and Q samples. In either case, designing a receiver with I/Q detection usually requires significantly more hardware, software, or both, which in turn increases the size, weight, power consumption, and cost of the receiver.

SUMMARY

The following summary is made by way of example and not by way of limitation. It is merely provided to aid the reader in understanding some of the aspects of the subject matter described. Embodiments provide apparatus and methods which allow for baseband or intermediate frequency image reduction without use of a single sideband or image rejection mixer architecture for analog I/Q detection.

In one embodiment, a receiver assembly is provided. The receiver assembly includes a mixer, a local oscillator, a phase selector, a phase selector control, an analog-to-digital converter and a digital signal processor. The mixer has a first mixer input that is coupled to a first path, a second mixer input that is coupled to a second path and a mixer output that is coupled to an output path. The first path is coupled to receive a return signal detected by an antenna. The local oscillator is coupled to output an oscillator signal on the second path. The phase selector is within the second path to selectively change a phase of the oscillator signal between two or more distinct values. The phase selector control is configured to control the change of the phase of the phase selector. The analog-to-digital converter is coupled to the output path. The phase selector control is synchronized to a baseband frame timing that dictates when the analog-to-digital converter collects signal samples from the output of the mixer. A digital signal processor is used to process an output of the analog-to-digital converter.

In another example embodiment, an altimeter with quadrature detection without oversampling is provided. The altimeter includes at least on antenna, a receiver and a signal processing system. The receiver includes a mixer, a local oscillator, a phase selector, a phase selector control, an analog-to-digital converter. The mixer has a first mixer input that is coupled to a first path, a second mixer input that is coupled to a second path and a mixer output. The first path is coupled to receive a return signal detected by the at least one antenna. The local oscillator is coupled to output an oscillator signal on the second path based on a provided baseband frame timing. The phase selector is within the second path to selectively change a phase of the oscillator signal between two or more distinct values. The phase selector control is configured to control the change of the phase of the phase selector. The analog-to-digital converter is coupled to the output of the mixer. The phase selector control is synchronized to the baseband frame timing that dictates when the analog-to-digital converter collects signal samples from the output of the mixer. The signal processing system includes a digital signal processor used to process an output of the analog-to-digital converter.

In yet another embodiment, a method of operating a receiver with quadrature detection is provided. The method includes generating baseband frames. An oscillator signal is created within each of the baseband frames. A return signal is coupled to a first input of a mixer. Moreover, the oscillator signal is coupled to a second input of the mixer. A phase of the oscillator signal is selectively changed between two or more distinct values. Timing of the change being based at least in part on a baseband frame timing of the generated baseband frames. Samples of an output of the mixer are selectively collected based at least in part on the baseband frame timing.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

Figure 1:
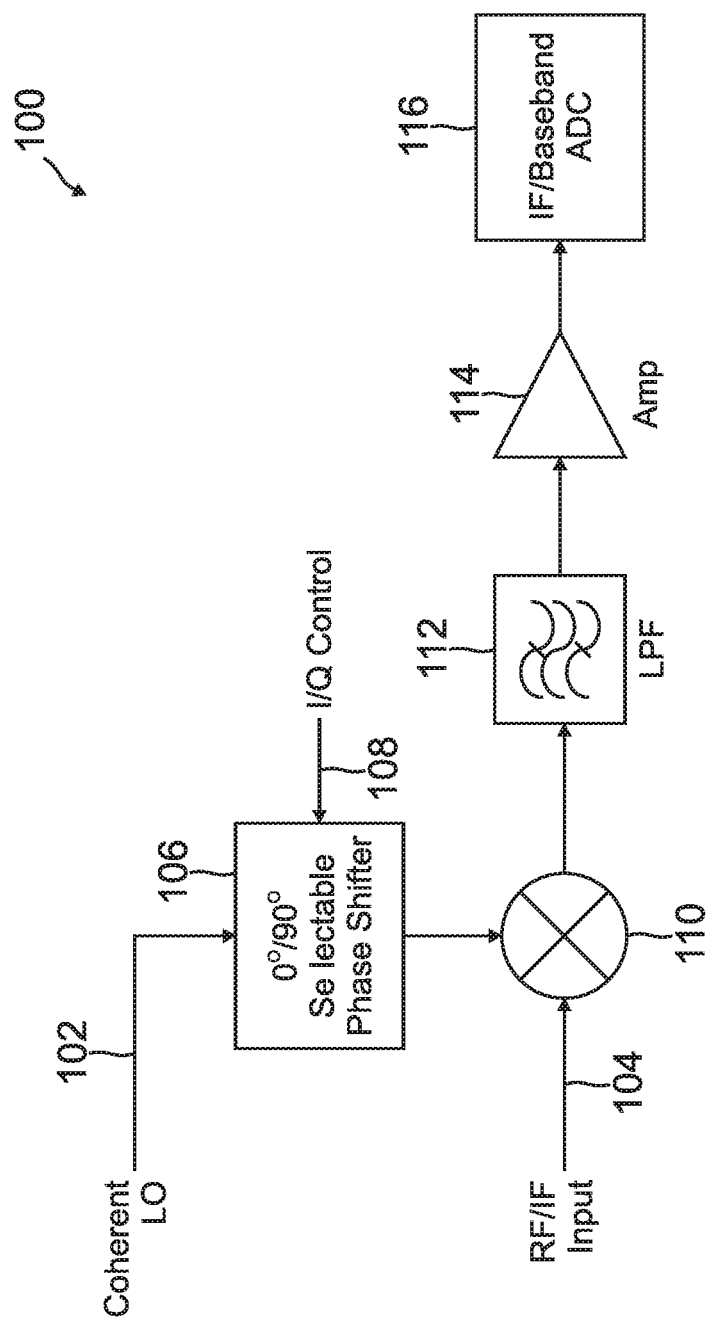
FIG. 1 is a block diagram of a general receiver architecture used to implement Pseudo-I/Q sampling according to one exemplary embodiment.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide I/Q detection systems for certain types of radio and radar receivers which greatly decrease the implementation cost associated with conventional approaches. In particular, embodiments employ a receiver configuration that allows for quadrature sampling known as "Pseudo-I/Q." Pseudo-I/Q allows for baseband or intermediate frequency (IF) image rejection without the use of a single sideband or image rejection mixer architecture for analog I/Q detection. Pseudo-I/Q of embodiments use the same baseband or IF signal chain for both I and Q samples. This greatly reduces the number of hardware components required to achieve the desired image rejection capability, which thus reduces the size, weight, and power consumption of the receiver. Unlike direct IF sampling with digital I/Q detection methods, Pseudo-I/Q does not require increasing the sampling rate or dynamic range of the analog-to-digital converter (ADC), or substantial additional digital processing to extract the I and Q signals.

The application of Pseudo-I/Q is applicable in cases where the received RF signal can be divided into repeated frames, with the signal characteristics exhibiting only minute differences in successive frames over reasonably short time intervals (e.g. from one frame to the next). Further, the timing of the receiver frames must be synchronous to the received RF signal itself. These conditions are readily met in the most straightforward manner in the case of a coherent radar system. Such a system receives a radio frequency (RF) signal consisting of either pulses or modulated continuous wave (CW) signals at regular intervals. This provides a natural division of the signal into frames equal either to the pulse repetition interval (PM) or the modulation period, and because the received signal is a delayed version of the transmitted signal generated by the same system, the frame timing will be synchronous to the received signal. In addition, such radar systems are typically designed with PRIs or modulation periods which will allow for coherent integration of successive frames, which means that the received signal characteristics should not change much over a time period consisting of a small number of frames. Although the discussion and example embodiments are discussed as being based on the case of Single Antenna Radar Altimeter (SARA) examples, the systems and methods described may be generally applied to any radio system which meets the conditions as discussed in the above paragraphs.

The Pseudo-I/Q apparatus and method was originally designed to improve the detection and tracking capabilities of SARA at low altitudes such as below 6 feet. SARA is a frequency-modulated continuous wave (FMCW) coherent radar system with a direct conversion receiver which measures altitude using a baseband Fast Fourier Transform (FFT). The baseband signal is generated by mixing the received RF signal with the transmitted RF signal. Because the frequency modulation is a linear sweep, this baseband frequency is directly proportional to the round-trip propagation delay of the transmitted signal, and is therefore directly proportional to altitude. Because SARA is a FMCW system, it must simultaneously transmit and receive RF signals. Moreover, on SARA this is accomplished using just one antenna for both transmission and reception of the signals. It is therefore paramount to maintain excellent transmit-to-receive isolation within the SARA hardware, in order to prevent the strong transmit signal from interfering with the detection of the weak receive signal. Transmit leakage may hamper performance of SARA.

Figure 8A:
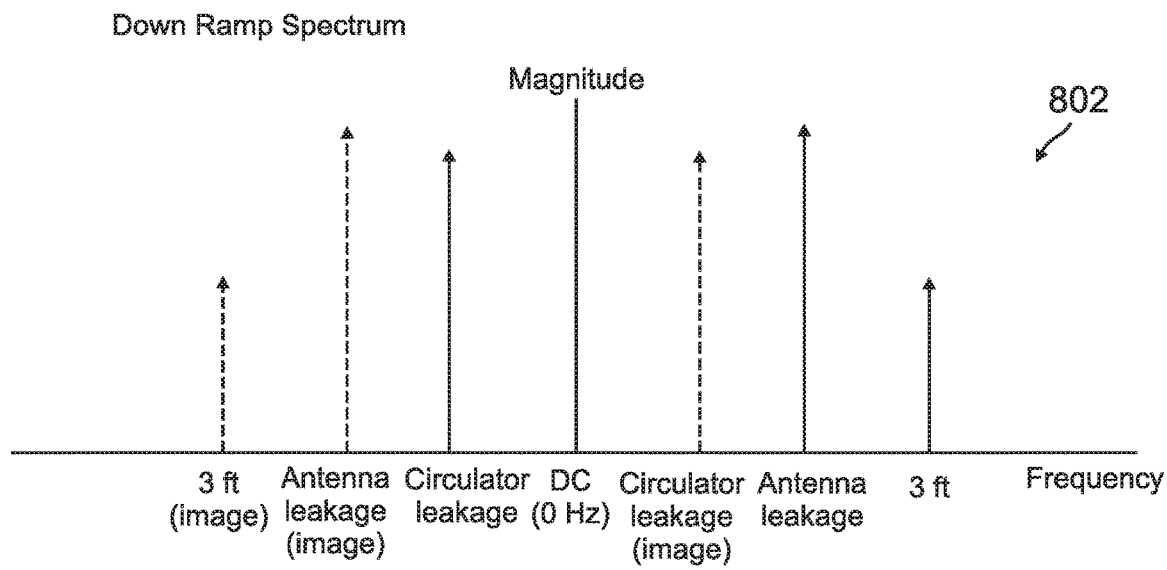
FIG. 8A is a graph illustrating a down ramp spectrum with SARA baseband signals with a three foot altitude target, antenna leakage and circulator leakage of the prior art.
Figure 8B:
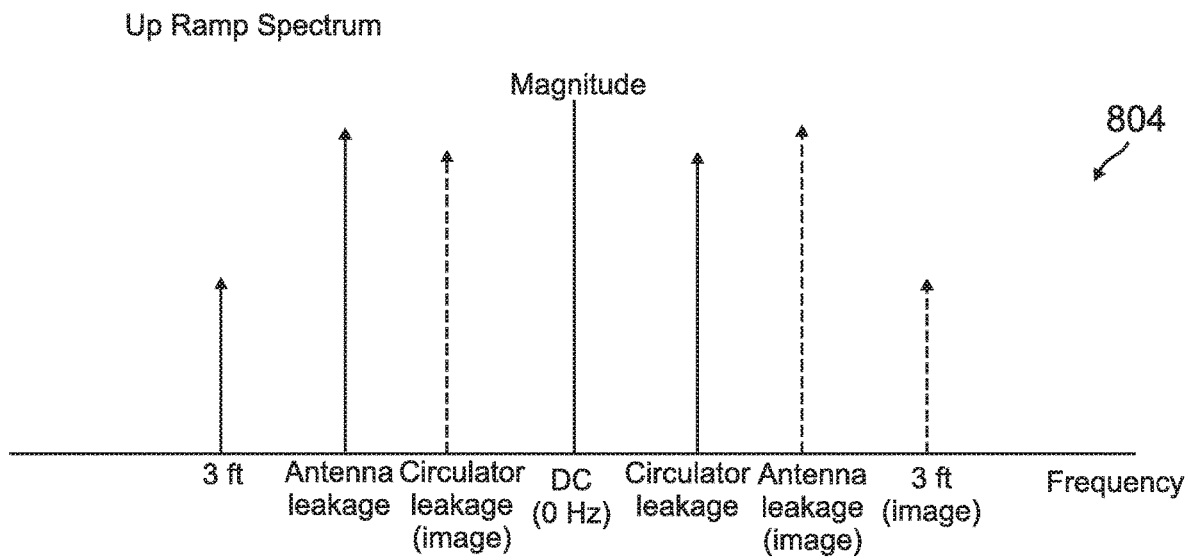
FIG. 8B is a graph illustrating an up ramp spectrum with SARA baseband signals with a three foot altitude target, antenna leakage and circulator leakage of the prior art.

A local oscillator (LO) delay line 208 (illustrated in FIG. 2) may be used in a SARA receiver and a capacitor 218 at a mixer output to address the leakage problem. By tuning the delay line to match the total delay of the primary leakage path (from a transmission directional coupler to a mixer RF port), the baseband signal component corresponding to the transmit leakage will appear as direct current (DC). This DC component may be filtered out with a DC blocking capacitor 218 before the signal is sampled, thus preventing the leakage from interfering with other baseband signal components such as altitude targets. Unfortunately, the SARA receiver architecture permits not one, but two primary leakage paths, namely the reflection of the signal off of the antenna at its connection port due to impedance mismatch (antenna S11 leakage), and the reverse path through a circulator (circulator leakage). The antenna leakage path typically provides about 20-22 dB of transmit-to-receive isolation, while the circulator path yields about 26-28 dB of isolation. The antenna leakage path length is about 2.5-3 nanoseconds, while the circulator leakage delay is in the hundreds of picoseconds. A down ramp spectrum 802 is illustrated in FIG. 8A and up ramp spectrum 804 is illustrated in FIG. 8B. These Figures illustrate SARA baseband signals with a 3 foot altitude target, antenna leakage and circulator leakage. The delay line is not tuned to cancel out either leakage target. As a result, the baseband signals from the leakage paths cause strong clutter in the 3 foot altitude bin, making it nearly impossible to detect altitude targets at 3 ft and below.

The effect of the LO delay line calibration is to shift the entire complex baseband spectrum to the left (by increasing the delay) or right (by decreasing the delay). Without any form of image rejection, this action will cause an equal and opposite shift to the image spectrum. Because the two leakage paths land at different baseband frequencies, the delay line cannot directly attenuate both paths by placing them at DC. If the circulator leakage is placed at DC, then the antenna leakage remains and is shifted rightward to a higher frequency. If the antenna leakage is placed at DC, then the circulator leakage image is shifted rightward to a higher frequency. Since the DC blocking capacitor results in a HPF response, shifting the leakage targets rightward actually worsens their impact on the 3 foot altitude bin, making it more difficult to detect altitude targets in this range.

The delay line calibration can also be used to move the antenna leakage and the circulator leakage image so that they fall at very nearly the same baseband frequency. If the calibration is just right, doing so will actually cause destructive interference of the two leakage paths, greatly reducing their contribution to clutter in the 3 foot bin. However, minor variations in the leakage signals due to temperature, pressure, or aging could cause the phase to become misaligned and degrade the calibration, possibly even producing constructive interference of the leakage signals. Further, this approach requires an extremely fine calibration of the delay line which requires significant time, labor, and iteration, rendering it impractical for the production SARA design.

Figure 9A:
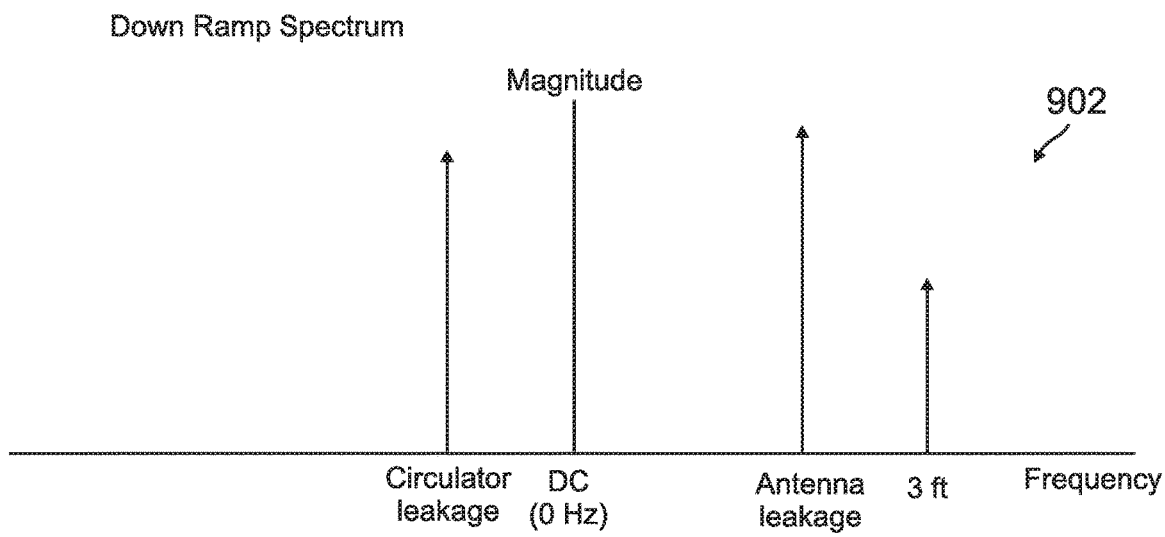
FIG. 9A is a graph illustrating a down ramp spectrum with SARA leakage signals and a three foot altitude target with image rejection of one exemplary embodiment.
Figure 9B:
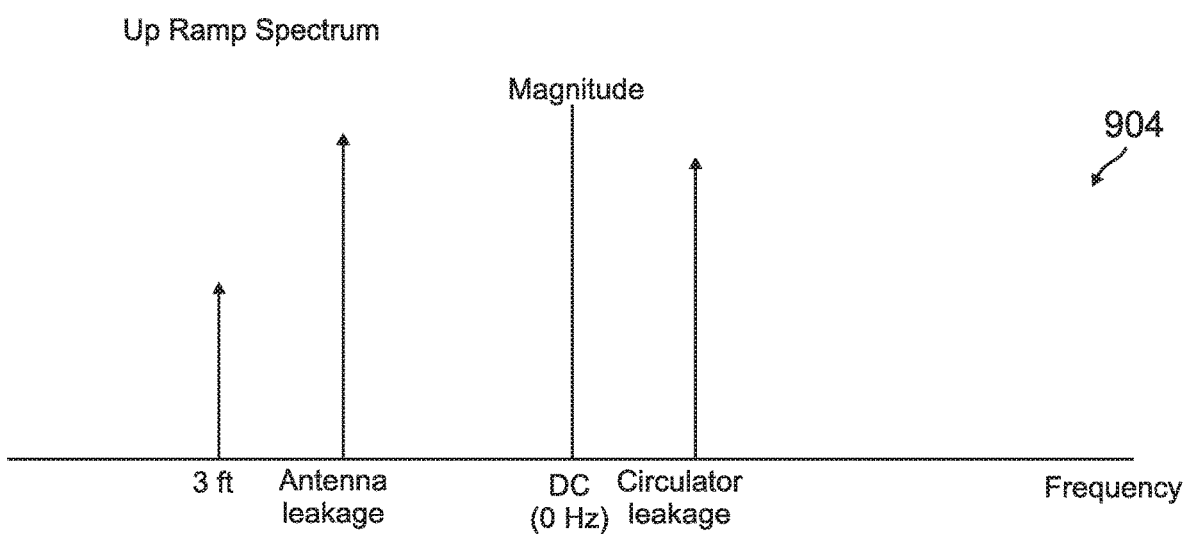
FIG. 9B is a graph illustrating an up ramp spectrum with SARA leakage signals and a three foot altitude target with image rejection of one exemplary embodiment.
Figure 10A:
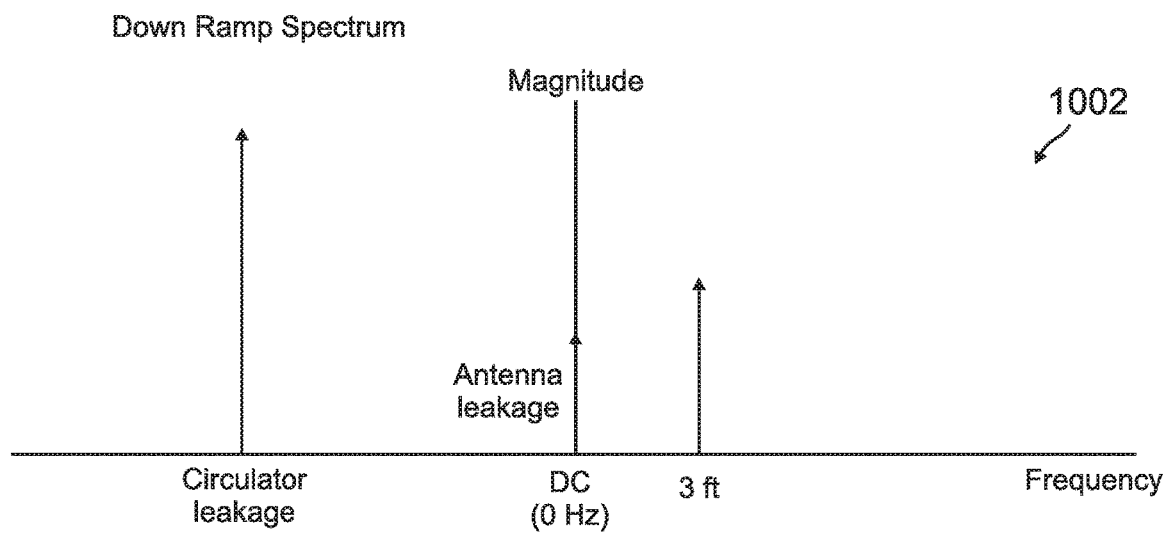
FIG. 10A is a graph illustrating a down ramp spectrum with SARA leakage signals and a three foot altitude target with image rejection and delay line calibration of one exemplary embodiment.
Figure 10B:
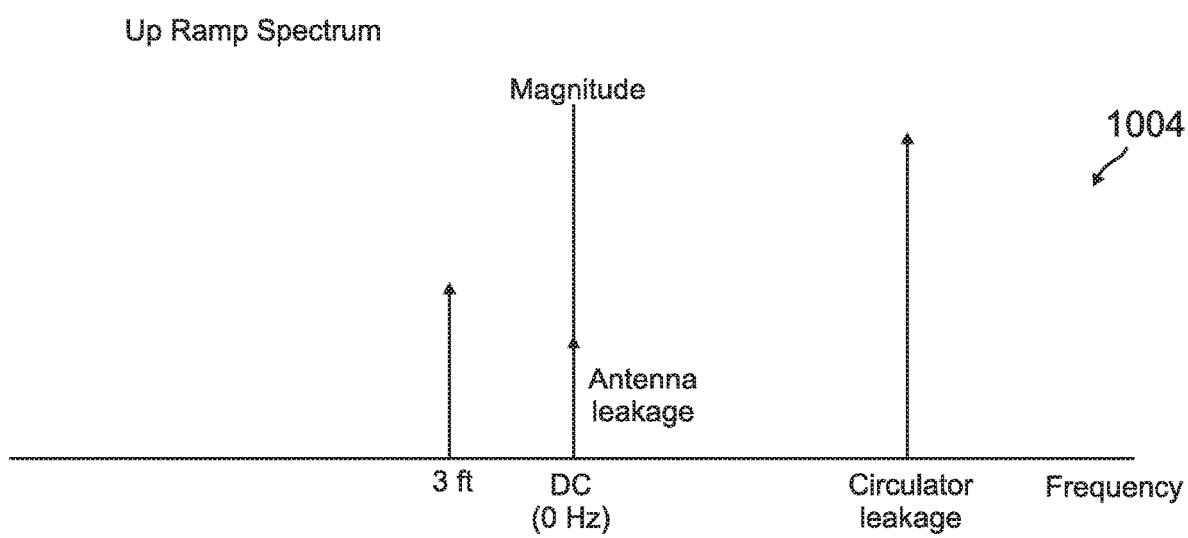
FIG. 10B is a graph illustrating an up ramp spectrum with SARA leakage signals and a three foot altitude target with image rejection and delay line calibration of one exemplary embodiment.

Since the delay line calibration alone cannot address both leakage signals, a new or supplemental approach must be developed. The best way to do this may be to take advantage of the large separation in baseband frequency between the two leakage signals. While this was a drawback when trying to calibrate the delay line previously, it can be seen that if the image frequencies of the leakage signals can be rejected, then the delay line can simply be used to place one of the signals at DC. In particular, if the circulator leakage image is rejected, and the antenna leakage is placed at DC using the delay line, then the only remaining leakage signal will be the circulator leakage (on the opposite side of DC from the positive altitude targets). FIGS. 9A, 9B, 10A and 10B illustrate this approach. In particular, FIG. 9A illustrates SARA leakage signals in a down ramp spectrum 902 and FIG. 9B illustrates SARA leakage signals in an up ramp spectrum 904 both along with 3 foot altitude with target image rejection. FIG. 10A illustrates the down ramp spectrum 1002 and FIG. 10B illustrates the up ramp spectrum 1004 both along with the 3 foot target with image rejection and delay line calibration. Hence FIGS. 9A and 9B first show the leakage spectra with image rejection, and then FIGS. 10A and 10B show the spectra with both image rejection and the delay line calibration to put the antenna leakage signal at DC, where it is heavily attenuated. In this case SARA will no longer measure identical baseband spectra for both up and down ramps, but this can easily be corrected by reflecting the up ramp spectra across DC in the digital signal processor. The question remains, however, how to achieve image rejection in SARA systems. Both analog and digital I/Q detection may incur too great a cost to hardware, software, or both. Embodiments employ Psuedo-I/Q to resolve this issue.

The general approach to Pseudo-I/Q in an embodiment is to simply sample the I signal first, then change the phase of the mixer LO by 90°, and then sample the Q signal, all using the same IF/baseband signal chain. This approach of course requires that the signals of interest (including any clutter or interference which is to be discriminated or rejected from the desired signal spectrum) do not change significantly over the time period in which both the I and Q samples can be collected. Further, these signals must all remain coherent during this time period. These constraints can be readily met on SARA, where both the altitude targets and leakage clutter are coherent, and the signals will change very little over the handful of milliseconds required to collect both I and Q samples.

The implementation of a general receiver capable of Pseudo-I/Q require some minor modifications to analog electronics in a typical non-I/Q receiver architecture, as well as specific sampling methods and timing to produce the I and Q signals. Referring to FIG. 1, a general receiver architecture used to implement Pseudo-I/Q sampling in an embodiment is illustrated. FIG. 1 illustrates a RF or IF input from an antenna or IF stage output into a mixer 110. A local oscillator (LO) of the receiver provides a LO signal to a selectable phase shifter 106. Activation of the phase shifter 108 is controlled by an I/Q control signal input. An output of the selectable phase shifter 106 is coupled to the mixer 110. An output of the mixer 10 is provided to a low pass filter 112. An output of the low pass filter is coupled to an amplifier 114 and an output of the amplifier 114 is provided to an IF or Baseband analog-to-digital converter (ADC).

The selectable phase shifter 106 for the LO allows the IF or baseband signal to be sampled either in-phase or in quadrature based on the FQ Control input 108. This may be implemented as a digital phase shifter with 90° or better resolution, or more simply as a single-pole double-throw (SPDT) switch which selects between two signal paths which differ by 90° at the LO frequency. If a digital phase shifter is used, then any two phase settings may be utilized provided that they differ by 90° at the LO frequency (e.g. 0° and 90°, 180° and 270°, etc.). If the I and Q signals are sampled over a sufficiently short time period to ensure that the signal components of interest remain coherent and stable, then the FQ amplitude and phase balance will be determined by the properties of the LO phase shifter.

Figure 2:
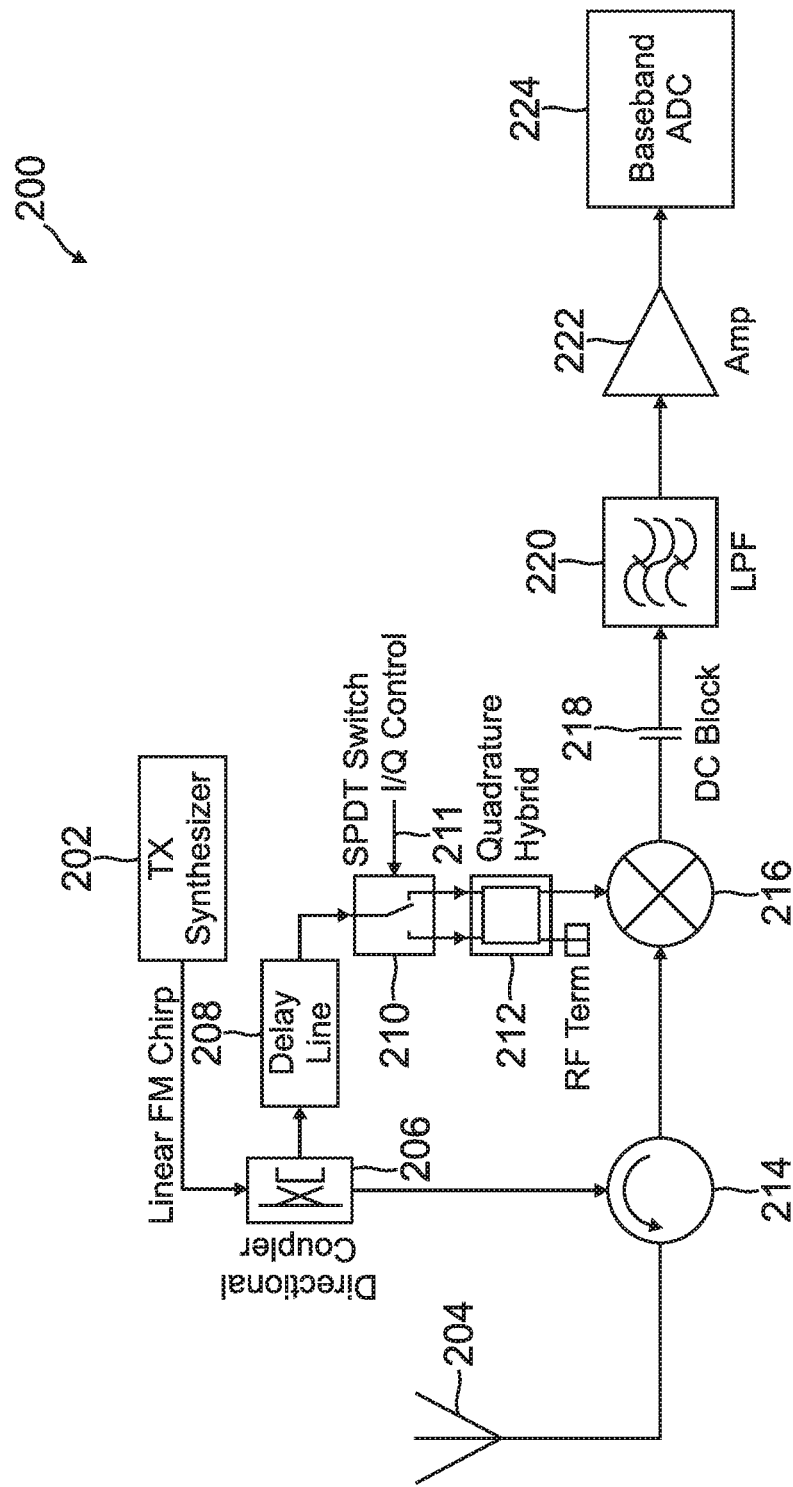
FIG. 2 is a block diagram of a transceiver for a single antenna radar altimeter (SARA) according to one exemplary embodiment.

FIG. 2 illustrates a simplified architecture of a SARA transceiver system 200 capable of Pseudo-I/Q in an embodiment. FIG. 2 illustrates an antenna 204 that is used to both transmit and receive signals. The antenna 204 is coupled to a circulator 214 that selectively passes FMCW ramp signals generated by a transmitter synthesizer 202 to the antenna 204 and return signals received by the antenna 204 to processing components of the transceiver system 200. In this example embodiment, the FMCW ramp signals generated by the transmitter synthesizer 202 are provided to a directional coupler 206. The directional coupler 206 is coupled to provide the generated FMCW ramp signals of the transmitter synthesizer 202 to the antenna 204 and to a delay line 208. An output of the delay line 208 is provided to a single-pole double-throw (SPDT) switch 210 that is controlled by an I/Q control input 211. A first output of switch 210 is coupled to a first input of a quadrature coupler 212 and a second output of switch 210 is coupled to a second input of the quadrature coupler 212. An output of the quadrature coupler 211 is coupled to mixer 216. A second input to the mixer 216 is coupled to the circulator 214 to receive signals received by the antenna 204. An output of the mixer 216 is coupled to a low pass filter 220 via DC block 218. The DC block is a capacitor 218 in an embodiment and is used with the delay line 208 as discussed above to address the leakage problem. An output of the low pass filter 220 is coupled to an amplifier 222. An output of the amplifier 222 is coupled to a baseband analog-to-digital converter (ADC) 224.

As illustrated, SARA receiver assembly 200 includes a local oscillator (LO) phase shifter which is implemented as a SPDT switch 211 and a quadrature coupler 212. This design provides an economical means to implement phase shifting. Because the LO signal in the SARA receiver consists of FMCW ramps, the phase difference between the I and Q signals will not be a constant 90° throughout each baseband frame. However, if the quadrature coupler is properly tuned to SARA's center frequency of 4.3 GHz, then the phase error at the ends of the ramp will be less than 2°. With amplitude errors of 0.5-1 dB, which can be easily obtained with the Pseudo-I/Q architecture, this 2° phase error can still result in an image rejection ratio of 25-30 dB.

Figure 3:
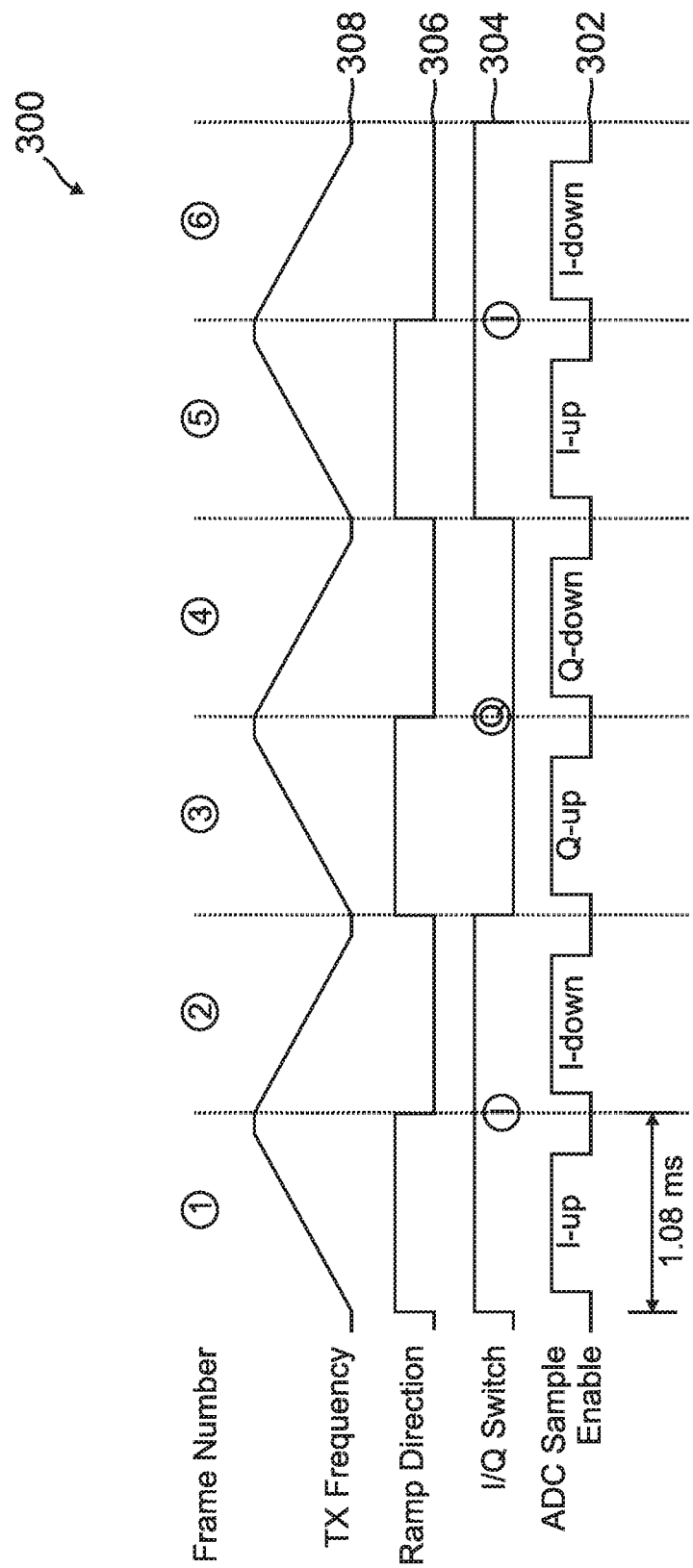
FIG. 3 illustrates a timing diagram of the Pseudo-I/Q sampling process on SARA in one exemplary embodiment.

The most critical aspect of sampling used in Pseudo-I/Q embodiments is that the I/Q control input 211 for the LO phase shifter is synchronous to the baseband frame timing which dictates when the ADC collects its samples. The specifics of this timing may vary greatly depending on the system and application. An example sampling process used in a Pseudo-I/Q embodiment in a SARA system is illustrated in the sampling timing diagram 300 of FIG. 3. In particular, FIG. 3 illustrates a timing diagram 300 of the Pseudo-I/Q sampling process on SARA spanning six frames generally indicated as 308. Each frame on SARA consists of either one up ramp or one down ramp. The time of each frame spans from the beginning of the ramp to the end of the turn-around period following the ramp, with a total duration of 1.08 milliseconds. The direction of the ramp in each frame can be detected using the Ramp Direction signal 306, which has a logic value of one (1) for up ramps and zero (0) for down ramps. This signal is output on each frame from an RF Field-Programmable Gate Array (FPGA) 402 (illustrated in the radar system of FIG. 4), in an embodiment, which controls the TX ramps 308 and timing, to a Digital Signal Processor (DSP) 406 also discussed below, which processes the baseband ADC samples to compute altitude. In addition, the I/Q Switch control line 304 indicates the LO phase setting, with a logic value of one (1) for in-phase and zero (0) for quadrature. This signal is also made available to the DSP 406 from the RF FPGA 402 in each frame. Within each frame, the ADC 224 is enabled to collect samples during a specific predefined window. The ADC 224 is actively collecting samples for the entire time the ADC Sample Enable signal 302 has a logic value of one (1). The samples collected in each frame are sent to the DSP 406, and marked with both the ramp direction and the LO phase setting of that frame (e.g. "I-up" or "Q-down"). The distinction between up and down ramps is necessary because the complex baseband spectrum will be reflected across DC on up ramps, with positive altitude targets appearing at negative baseband frequencies. In a FMCW system which uses only one ramp direction, or in a different type of system which produces the same complex baseband spectrum on each frame, it would only be necessary to associate with each frame of ADC samples the LO phase setting for that frame. The Ramp Direction signal alternates between up and down on each frame. The I/Q Switch control signal 304 alternates on every other frame. Therefore, the frames follow a repeating sequence of I-up, I-down, Q-up, Q-down. The I and Q signals from the up ramps will be processed together, and the I and Q signals from the down ramps will be processed together, so this timing ensures that the time between each set of associated I and Q samples is consistent and minimized. Again, if SARA produced the same complex baseband spectrum on both up and down ramps, it would not be necessary to differentiate the two. In this case the I/Q Switch control signal 304 could be alternated on every frame instead of every other frame.

Figure 4:
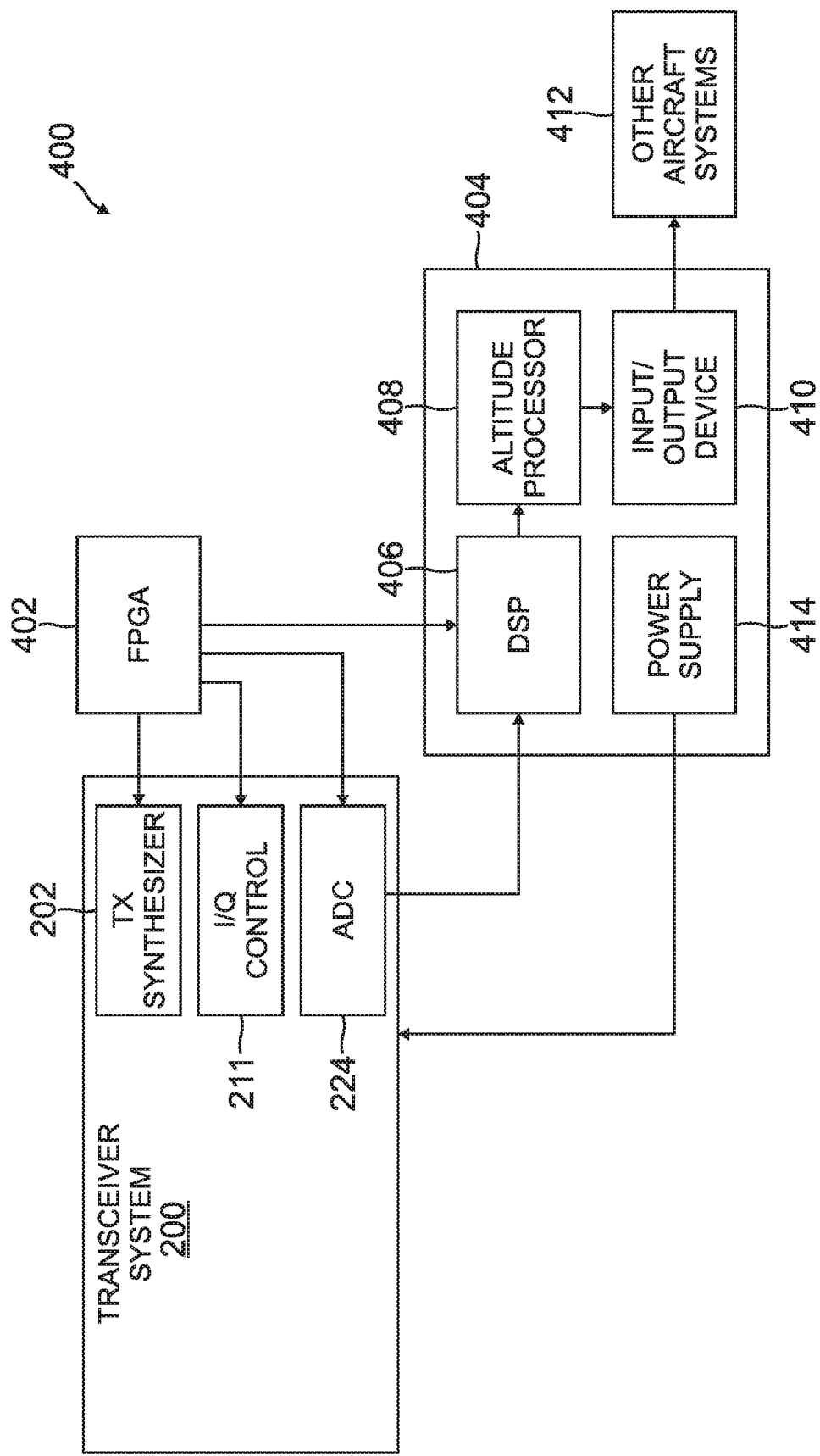
FIG. 4 is a block diagram of a radar system of one exemplary embodiment.

FIG. 4 is an exemplary radar system 400 including the receiver assembly 200 discussed above. The exemplary radar system 400 further includes FPGA 402 and a signal processing system 404. The FPGA 402 may be part of the receiver assembly 200, the signal processing system 404 or part of any other system. The signal processing system 404 in this example embodiment includes the DSP 406, an altitude processor 408 and an input/output device 410. As discussed above, the FPGA controls the TX ramps to the transmission synthesizer 202 of the transceiver system 200 and the timing to the DSP 406 of the signal processing system 404. The DSP 406 transforms the digital data from the ADC 224 into altitude bin data in an embodiment and then provides it to the altitude processor 408. The altitude processor 408 analyses the altitude bin data to determine distance to ground values. The input/output device 410 outputs the determined distance to ground values to other aircraft systems 412. The other aircraft systems 412 may include displays and flight controls. In an embodiment, as illustrated the FPGA provides the frames and frame timing to the transmission synthesizer (or oscillator). The FPGA in an embodiment also provides a signal to the I/Q control 211 and the ADC 224 based on frame timing to selectively switch the phase between two or more discrete phases with the I/Q control 211 and collect sampling with the ADC 224. Moreover, the FPGA provides information to the DSP 406 that is used by the DSP 406 during processing such as ramp direction and phase setting. Also illustrated in FIG. 4 is a power supply 414 used to power the receiver assembly 200.

In embodiments, the FPGA 402 and/or the DSP 406 may be a controller made of one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to the controller herein may be embodied as software, firmware, hardware or any combination thereof. The controller may be part of a system controller or a component controller. The memory may include computer-readable operating instructions that, when executed by the controller provides functions of the receiver. Such functions may include the functions of determining altitude information. The computer readable instructions may be encoded within the memory. Memory may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Figure 5:
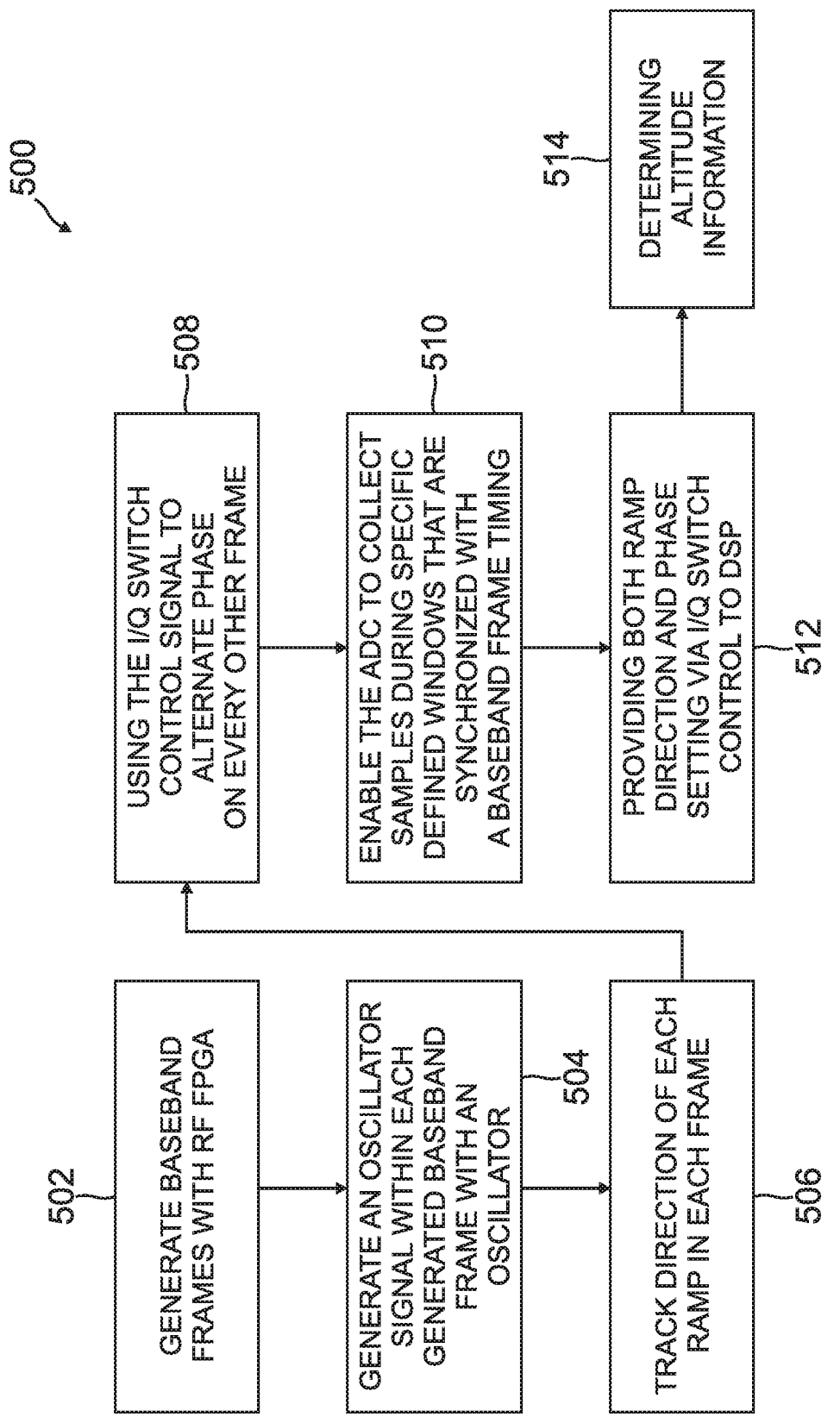
FIG. 5 illustrates a process flow diagram of one exemplary embodiment.

FIG. 5 illustrates a process flow diagram 500 of an example embodiment. FIG. 5 illustrates steps that are taken in an example. The steps in other examples may occur in a different order. As illustrated, in this example the process begins by generating baseband frames with a RF FPGA 402 at step (502). The frames are provided to an oscillator 202 which generates an oscillator signal with a ramp within each generated baseband frame at step (504). The direction of the each ramp is tracked at step (506). In one embodiment this is done with the FPGA 402. The FQ switch control 211 is then used in step (508) to alternate the phase of the oscillator signal to the mixer 216 on every other frame. The ADC 224 is enabled to collect samples during specific defined windows that are synchronized with the baseband frame timing at step (510). Both the ramp direction and phase settings are provided to the DSP 406 at step (512). The DSP 406 and altitude processor 408 process the received information to determine altitude information at step (514).

Figure 6:
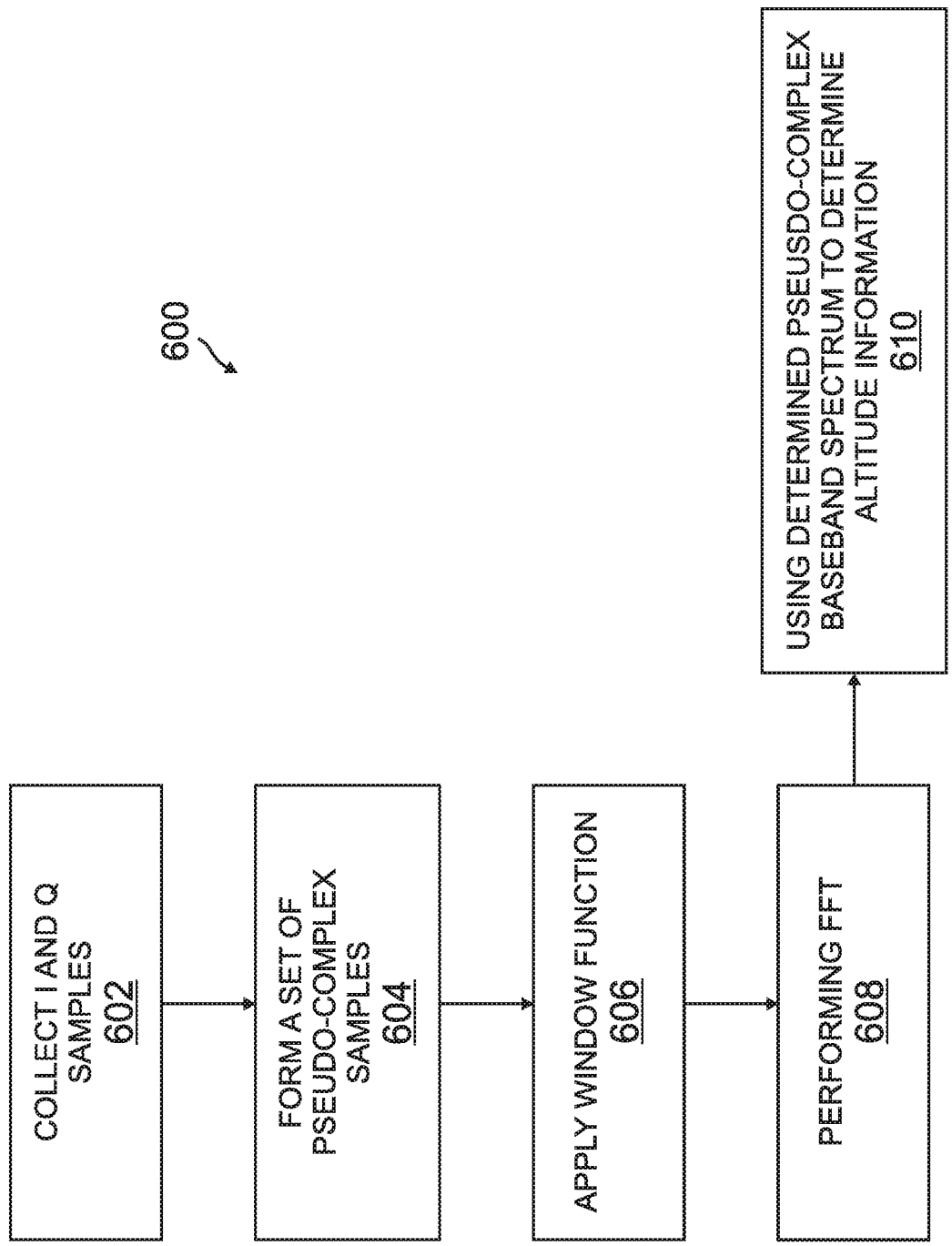
FIG. 6 illustrates a full complex baseband spectrum flow diagram of one exemplary embodiment.

In embodiments, with the ADC samples collected from each frame and tagged with the appropriate ramp direction and LO phase setting, they can now be processed to produce a full complex baseband spectrum. The most straightforward method of doing this may be to combine the real-valued I and Q samples to form a set of pseudo-complex samples, apply a window function if desired, and then perform the FFT to generate the pseudo-complex baseband spectrum. These steps are set out in the full complex baseband spectrum flow diagram 600 of FIG. 6. As illustrated, I and Q samples are collected at step (602). A set of pseudo-complex samples are formed from the collected samples at step (604). A window function is applied to the set of pseudo-complex samples at step (606). A FFT is then performed at step (608) to generate the pseudo-complex baseband spectrum. The pseudo-complex baseband spectrum is then used in determining altitude information at step (610). The determination of the pseudo-complex baseband spectrum as follows:

I frame samples: i[n]
Q frame samples: q[n]
Window function: w[n]
Pseudo-complex samples: x[n]=i[n]+jq[n]
Windowed pseudo-complex samples: y[n]=x[n]·w[n]
Spectrum:

$$X[k] = \sum_{n=0}^{N-1} y[n]e^{-2\pi jkn/N}, k = 0, 1, \ldots, N-1$$

Each of the sequences above has length N, which is the number of samples collected by the ADC 224 in each frame. The combined samples are denoted "pseudo-complex" because although they are in fact complex-valued, the real and imaginary components (i.e. I and Q signals) were not sampled simultaneously. Likewise, the output spectrum from the FFT operation is considered to be the "pseudo-complex" baseband spectrum. In SARA, separate pseudo-complex samples would need to be generated and separate FFT operations performed for up ramps and down ramps. However, the up ramp spectrum could simply be reflected across DC by re-indexing the sequence X[k], yielding the same spectrum as that measured on down ramps.

Although the previously described processing method is straightforward, it may be difficult to implement directly in the SARA software. The implementation cost can be greatly reduced by instead taking advantage of processing which SARA already does on every frame, and making corrections as needed to translate from the real baseband spectrum containing images to the pseudo-complex baseband spectrum with image rejection. On each frame, SARA applies a Hamming window to the ADC samples and performs a FFT with the resulting real-valued sequence. Therefore, it may be desirable to be able to combine the FFT output from I frames with the FFT output from Q frames to generate the equivalent FFT output of the combined pseudo-complex sequence. It is easy to show that this is a trivial process. Let $X_{I/Q}[k]$ be the previously-derived pseudo-complex baseband spectrum with window function w[n]. Then we have the following:

$$\begin{aligned} X_{I/Q}[k] &= \sum_{n=0}^{N-1} y[n]e^{-2\pi jkn/N} \\ &= \sum_{n=0}^{N-1} (x[n] \cdot w[n])e^{-2\pi jkn/N} \\ &= \sum_{n=0}^{N-1} (\{i[n] + jq[n]\} \cdot w[n])e^{-2\pi jkn/N} \\ &= \sum_{n=0}^{N-1} (i[n] \cdot w[n] + jq[n] \cdot w[n])e^{-2\pi jkn/N} \\ &= \sum_{n=0}^{N-1} (i[n] \cdot w[n])e^{-2\pi jkn/N} + j\sum_{n=0}^{N-1} (q[n] \cdot w[n])e^{-2\pi jkn/N} \\ &= X_I[k] + jX_Q[k] \end{aligned}$$

$$\therefore X_{I/Q}[k] = X_I[k] + jX_Q[k]$$

In the above equations, XI[k] denotes the real baseband spectrum computed on an I frame with window function w[n], and XQ[k] denotes the real baseband spectrum computed on a Q frame with window function w[n]. It is important to note that although these sequences are referred to as "real" baseband spectra, they are in fact complex-valued. However, the values of the real baseband spectra at negative frequencies will simply be the complex conjugates of the values at the associated positive frequencies, yielding the same power spectrum on both sides of DC (image frequencies are not rejected). In the complex or pseudo-complex baseband spectra, though, these images are rejected yielding independent power spectra on either side of DC.

Figure 7:
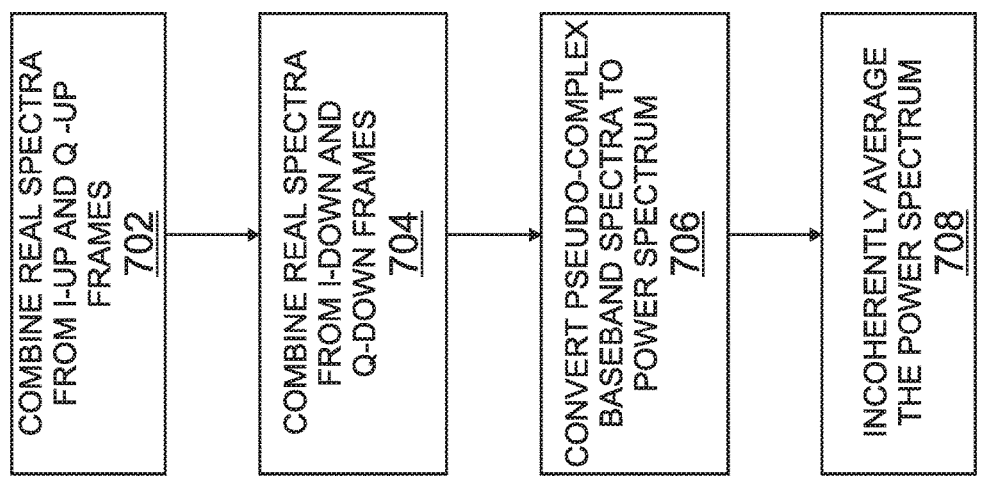
FIG. 7 illustrates a power spectrum flow diagram of one exemplary embodiment.

We can take advantage of the existing FFTs computed on each frame in the SARA software, rather than computing additional FFTs with complex-valued input. The ultimate goal is to obtain a power spectrum corresponding to positive altitude delays (i.e. positive baseband frequencies on down ramps, and negative baseband frequencies on up ramps) with image frequencies rejected. This is generally illustrated in the steps of the power spectrum flow diagram 700 of FIG. 7. To do this, we will need to combine the real baseband spectra from I-up frames with the real baseband spectra from Q-up frames to form the pseudo-complex baseband spectra for each adjacent pair of up ramps as illustrated in step (702), and likewise with the I-down and Q-down frames for each adjacent pair of down ramps as illustrated in step (704). We can then convert each pseudo-complex baseband spectrum to a power spectrum as illustrated in step (706) by taking the magnitude squared of each complex value in the sequence. This process of computing the power spectrum can be integrated into the process of combining the real baseband spectra from the I and Q frames, thusly:

$$\begin{aligned} \|X_{I/Q}[k]\|^2 &= [\text{Re}(X_{I/Q}[k])]^2 + [\text{Im}(X_{I/Q}[k])]^2 \\ &= [\text{Re}(X_I[k]) - \text{Im}(X_Q[k])]^2 + [\text{Im}(X_I[k]) + \text{Re}(X_Q[k])]^2 \\ &= [\text{Re}(X_I[k])]^2 + [\text{Im}(X_Q[k])]^2 + [\text{Im}(X_I[k])]^2 + [\text{Re}(X_Q[k])]^2 - \\ &\quad 2\text{Re}(X_I[k])\text{Im}(X_Q[k]) + 2\text{Im}(X_I[k])\text{Re}(X_Q[k]) \\ &= \|X_I[k]\|^2 + \|X_Q[k]\|^2 + 2[\text{Im}(X_I[k])\text{Re}(X_Q[k]) - \\ &\quad \text{Re}(X_I[k])\text{Im}(X_Q[k])] \end{aligned}$$

Therefore, the pseudo-complex baseband power spectrum is equal to the sum of the real baseband power spectra from the I and Q frames, plus an additional factor consisting of the real and imaginary parts of the complex-valued real baseband spectra from the I and Q frames. Further, the necessary reflection of the pseudo-complex power spectrum across DC for up ramps can be easily accomplished by changing the sign of the imaginary parts of the real baseband spectra:

$$\|X_{I/Q}^{up}[k]\|^2 = \|X_I[k]\|^2 + \|X_Q[k]\|^2 + 2[Re(X_I[k])Im(X_Q[k]) - Im(X_I[k])Re(X_Q[k])]$$

We can now compute the appropriate pseudo-complex baseband power spectra for both up and down ramps based on the complex-valued output sequences of the FFTs already computed on each frame. Since the Pseudo-I/Q timing requirements in SARA result in a sequence which repeats every four frames, it is additionally useful to conduct all necessary Pseudo-I/Q signal processing four frames at a time. The output of each set of four frames will be one pseudo-complex baseband spectrum measured during up ramps, and one pseudo-complex baseband spectrum measured during down ramps. By incoherently averaging these spectra (i.e. averaging in power) as illustrated in step (708), we can obtain a single result from each batch of four frames that is processed. This result is an average power spectrum, taken over four frames, which includes rejection of unwanted image frequencies due to leakage of the transmitted signal directly into the receiver. The averaging process provides an additional small improvement in signal-to-noise ratio (SNR). The average power can be computed as follows, combining in one step the joining of I and Q frame spectra to form pseudo-complex spectra, the reflection of up ramp spectra across DC, and the incoherent averaging of the up ramp and down ramp spectra:

$$\|\overline{X_{I/Q}[k]}\|^2 = \frac{1}{2}\left(\|X_{I/Q}^{up}[k]\|^2 + \|X_{I/Q}^{down}[k]\|^2\right)$$

$$= \frac{1}{2}\left(\|X_I^{up}[k]\|^2 + \|X_I^{down}[k]\|^2 + \|X_Q^{up}[k]\|^2 + \|X_Q^{down}[k]\|^2\right) +$$

$$Re(X_I^{up}[k])Im(X_Q^{up}[k]) + Im(X_I^{down}[k])Re(X_Q^{down}[k]) -$$

$$Im(X_I^{up}[k])Re(X_Q^{up}[k]) - Re(X_I^{down}[k])Im(X_Q^{down}[k])$$

This average power for the pseudo-complex baseband spectrum does not need to be computed for all frequency bins k. Instead, these values can be computed only for the bins for which image rejection capabilities are desired. In the case of SARA, this is in the lowest altitude bins (e.g. below 10-15 feet), where the leakage clutter resides. Therefore, we can combine the pseudo-complex baseband power spectrum in the first few altitude bins with the real baseband power spectrum, computed by simply taking the magnitude squared of the FFT output in each frame, for the remainder of the altitude bins. To maintain consistent power scaling between the pseudo-complex and real portions of the spectrum, an additional factor of one-half should be applied to the average pseudo-complex power spectrum bins:

$$\|\overline{X_{I/Q}[k]}\|^2 = \frac{1}{4}\left(\|X_I^{up}[k]\|^2 + \|X_I^{down}[k]\|^2 + \|X_Q^{up}[k]\|^2 + \|X_Q^{down}[k]\|^2\right) +$$

$$= \frac{1}{2}[Re(X_I^{up}[k])Im(X_Q^{up}[k]) + Im(X_I^{down}[k])Re(X_Q^{down}[k]) -$$

$$Im(X_I^{up}[k])Re(X_Q^{up}[k]) - Re(X_I^{down}[k])Im(X_Q^{down}[k])]$$

Notice that the first term in this equation (with coefficient one-fourth) is equal simply to the average of the real baseband power spectra across the four frames, and the second term (with coefficient one-half) comprises a correction factor to convert this average power spectrum from real to pseudo-complex. This fact may allow for further simplification of the signal processing if the power average of the four frames is already computed (e.g. to improve SNR) prior to implementing Pseudo-I/Q.

EXAMPLE EMBODIMENTS

Example 1 is a receiver assembly. The receiver assembly includes a mixer, a local oscillator, a phase selector, a phase selector control, an analog-to-digital converter and a digital signal processor. The mixer has a first mixer input that is coupled to a first path, a second mixer input that is couple to a second path and a mixer output that is coupled to an output path. The first path is coupled to receive a return signal detected by an antenna. The local oscillator is coupled to output an oscillator signal on the second path. The phase selector is within the second path to selectively change a phase of the oscillator signal between two or more distinct values. The phase selector control is configured to control the change of the phase of the phase selector. The analog-to-digital converter is coupled to the output path. The phase selector control is synchronized to a baseband frame timing that dictates when the analog-to-digital converter collects signal samples from the output of the mixer. A digital signal processor is used to process an output of the analog to digital converter.

Example 2, includes the receiver assembly of Example 1, wherein the phase selector is a phase shifter.

Example 3 includes the receiver assembly of Examples 1, wherein the phase selector is a combination of a switch and a quadrature hybrid.

Example 4 includes the receiver assembly of any of the Examples 1-2, further including a directional coupler and circulator. The directional coupler is configured to selectively couple the oscillator signal to the second path and to the antenna. The circulator is coupled to selectively provide the oscillator signal to the antenna and the returned signal detected by the antenna to the mixer.

Example 5 includes the receiver assembly of any of the Examples 1-4, further including a delay line in the second path and a direct current block. The direct current block is coupled between the mixer and the analog to digital converter. The delay line and direct current block are configured to suppress low-frequency leakage signals on the first path.

Example 6 includes the receiver assembly of any of the Examples 1-5, further including a low pass filter and an amplifier coupled between the mixer and the analog-to-digital converter.

Example 7 is an altimeter with quadrature detection without oversampling. The altimeter includes at least on antenna, a receiver and a signal processing system. The receiver includes a mixer, a local oscillator, a phase selector, a phase selector control, an analog-to-digital converter. The mixer has a first mixer input that is coupled to a first path, a second mixer input that is coupled to a second path and a mixer output. The first path is coupled to receive a return signal detected by the at least one antenna. The local oscillator is coupled to output an oscillator signal on the second path based on a provided baseband frame timing. The phase selector is within the second path to selectively change a phase of the oscillator signal between two or more distinct values. The phase selector control is configured to control the change of the phase of the phase selector. The analog-to-digital converter is coupled to the output of the mixer. The phase selector control is synchronized to the baseband frame timing that dictates when the analog-to-digital converter collects signal samples from the output of the mixer. The signal processing system includes a digital signal processor used to process an output of the analog-to-digital converter.

Example 8 includes the altimeter of Example 7, wherein the digital signal processor is configured to transform digital data from the analog-to-digital converter into altitude bin data.

Example 9 includes the altimeter of any of the Examples 7-8, wherein the signal processor system further includes an altitude processor configured to determine distance to ground values.

Example 10 includes the altimeter of any of the Examples 7-9, further including a field-programmable gate array configured to generate the baseband frame timing used by the coherent local oscillator in outputting the oscillator signal.

Example 11 includes the altimeter of any of the Examples 7-10, wherein the phase selector is one of a phase shifter and a combination of a switch and a quadrature hybrid.

Example 12 includes the altimeter of any of the Examples 7-8, further including a directional coupler, a circulator, a delay line and a direct current block. The directional coupler is configured to selectively couple the oscillator signal to the second path and to the at least one antenna. The circulator is coupled to selectively provide the oscillator signal to the antenna and the received signals from the antenna to the mixer. The delay line is positioned in the second path. The direct current block is coupled between the mixer and the analog-to-digital converter. The delay line and the direct current block configured to suppress low-frequency leakage signals on the first path.

Example 13 is a method of operating a receiver with quadrature detection. The method includes generating baseband frames. An oscillator signal is created within each of the baseband frames. A return signal is coupled to a first input of a mixer. Moreover, the oscillator signal is coupled to a second input of the mixer. A phase of the oscillator signal is selectively changed between two or more distinct values. Timing of the change being based at least in part on a baseband frame timing of the generated baseband frames. Samples of an output of the mixer are selectively collected based at least in part on the baseband frame timing.

Example 14, includes the method of Example 13, wherein creating the oscillator signal within each of the baseband frames further includes generating transmission frequency-modulated continuous wave ramps based on the baseband frame timing.

Example 15 includes the method of any of the Examples 13-14, further including tracking ramp directions and using the ramp direction in computing altitude information.

Example 16 includes the method of any of the Examples 13-15, wherein selectively changing between two or more distinct values based at least in part on the baseband frame timing of the generated baseband frames further includes changing the phase of the oscillator signal by 90 degrees at every other frame of the baseband frames.

Example 17 includes the method of any of the Examples 13-16, wherein selectively collecting samples of the output of the mixer further based at least in part on the baseband frame timing further includes selectively collecting samples of an output of the mixer with an analog-to-digital converter.

Example 18 includes the method of any of the Examples 13-17, further including collecting both in-phase (I) and quadrature (Q) samples; combining the I and Q samples to form a set of pseudo-complex samples; applying a window function to the pseudo-complex samples; and performing Fast Fourier Transforms (FFT) to generate a pseudo-complex baseband spectrum.

Example 19 includes the method of any of the Examples 13-18, further including combining real baseband spectra of a Fast Fourier Transform (FFT) output from in-phase (I) frames determined by a single antenna radar altimeter process with an FFT output of quadrature (Q) frames to generate an equivalent FFT output of a combined pseudo-complex sequence.

Example 20 includes the method of Example 19, further including combining real spectra from I-up frames with real baseband spectra from Q-up frames to form the pseudo-complex baseband spectra for each adjacent pair of up ramps; combining real spectra from I-down frames with real baseband spectra from Q-down frames to form the pseudo-complex baseband spectra for each adjacent pair of down ramps; converting each of the pseudo-complex baseband spectra to a power spectrum by taking a magnitude squared of each complex value in a sequence; and averaging the power spectrum.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A receiver assembly of a frequency-modulated continuous wave (FMCW) coherent altimeter comprising:
    a mixer having a first mixer input coupled to a first path, a second mixer input coupled to a second path and a mixer output coupled to an output path, the first path coupled to receive a return signal detected by an antenna;
    a controller to generate baseband frames and track each FMCW ramp direction;
    a local oscillator coupled to output an oscillator signal based on the baseband frames on the second path;
    a phase selector within the second path to selectively change a phase of the oscillator signal between two or more distinct values;
    a phase selector control configured to control the change of the phase of the phase selector;
    an analog-to-digital converter coupled to the output path, the phase selector control being synchronized to a baseband frame timing that dictates when the analog-to-digital converter collects signal samples from the output of the mixer;
    a digital signal processor to process an output of the analog-to-digital converter using the FMCW ramp direction and phase; and
    an altitude processor coupled to receive an output of the digital signal processor, the altitude processor configured to determine altitude information.

2. The receiver assembly of claim 1, wherein the phase selector is a phase shifter.

3. The receiver assembly of claim 1 wherein the phase selector is a combination of a switch and a quadrature hybrid.

4. The receiver assembly of claim 1, further comprising:
a directional coupler configured to selectively couple the oscillator signal to the second path and to the antenna; and
a circulator coupled to selectively provide the oscillator signal to the antenna and the returned signal detected by the antenna to the mixer.

5. The receiver assembly of claim 1, further comprising:
a delay line in the second path; and
a direct current block coupled between the mixer and the analog to digital converter, the delay line and direct current block configured to suppress low-frequency leakage signals on the first path.

6. The receiver assembly of claim 1, further comprising:
a low pass filter; and
an amplifier coupled between the mixer and the analog-to-digital converter.

7. An altimeter with quadrature detection without oversampling, the altimeter comprising:
at least one antenna;
a receiver including:
a mixer having a first mixer input coupled to a first path, a second mixer input coupled to a second path and a mixer output, the first path coupled to receive a return signal detected by the at least one antenna,
a controller to generate baseband frames and track each frequency-modulated continuous wave (FMCW) ramp direction;
a local oscillator coupled to output an oscillator signal on the second path based on a provided baseband frame timing,
a phase selector within the second path to selectively change a phase of the oscillator signal between two or more distinct values,
a phase selector control configured to control the change of the phase of the phase selector, and
an analog-to-digital converter coupled to the output of the mixer, the phase selector control synchronized to the baseband frame timing that dictates when the analog-to-digital converter collects signal samples from the output of the mixer;
a signal processing system including a digital signal processor to process an output of the analog-to-digital converter using the FMCW ramp direction and phase; and
an altitude processor coupled to receive an output of the digital signal processor, the altitude processor configured to determine altitude information using the FMCW ramp direction to obtain a power spectrum corresponding to positive altitude delays.

8. The altimeter of claim 7, wherein the digital signal processor is configured to transform digital data from the analog-to-digital converter into altitude bin data.

9. The altimeter of claim 8, wherein the signal processor system further comprises:
an altitude processor configured to determine distance to ground values.

10. The altimeter of claim 7, further comprising:
a field-programmable gate array configured to generate the baseband frame timing used by the coherent local oscillator in outputting the oscillator signal.

11. The altimeter of claim 7, wherein the phase selector is one of a phase shifter and a combination of a switch and a quadrature hybrid.

12. The altimeter of claim 7, further comprising:
a directional coupler configured to selectively couple the oscillator signal to the second path and to the at least one antenna;
a circulator coupled to selectively provide the oscillator signal to the antenna and the received signals from the antenna to the mixer;
a delay line in the second path; and
a direct current block coupled between the mixer and the analog-to-digital converter, the delay line and direct current block configured to suppress low-frequency leakage signals on the first path.

13. A method of operating a receiver with quadrature detection of an altimeter, the method comprising:
generating baseband frames;
creating an oscillator signal within each of the baseband frames by generating transmission frequency-modulated continuous wave (FMCW) ramps based on the baseband frame timing;
tracking FMCW ramp directions in each baseband frame;
coupling a return of the oscillator signal to a first input of a mixer;
coupling the oscillator signal to a second input of the mixer;
selectively changing a phase of the oscillator signal between two or more distinct values, a timing of the changing of the phase based at least in part on a baseband frame timing of the generated baseband frames;
selectively collecting samples of an output of the mixer further based at least in part on the baseband frame timing; and
using the FMCW ramp direction in computing altitude information.

14. The method of claim 13, further comprising: using the FMCW ramp direction in computing altitude information.

15. The method of claim 13, wherein selectively changing a phase of the oscillator signal between two or more distinct values based at least in part on the baseband frame timing of the generated baseband frames further comprises:
changing the phase of the oscillator signal by 90 degrees at every other frame of the baseband frames.

16. The method of claim 13, wherein selectively collecting samples of the output of the mixer further based at least in part on the baseband frame timing further comprises:
selectively collecting samples of an output of the mixer with an analog-to-digital converter.

17. The method of claim 13, further comprising:
collecting both in-phase (I) and quadrature (Q) samples;
combining the I and Q samples to form a set of pseudo-complex samples;
applying a window function to the pseudo-complex samples; and
performing Fast Fourier Transforms (FFT) to generate a pseudo-complex baseband spectrum.

18. The method of claim 13, further comprising:
combining real baseband spectra of a Fast Fourier Transform (FFT) output from in-phase (I) frames determined by a single antenna radar altimeter process with an FFT output of quadrature (Q) frames to generate an equivalent FFT output of a combined pseudo-complex sequence.

19. The method of claim 18, further comprising:
combining real spectra from I-up frames with real baseband spectra from Q-up frames to form the pseudo-complex baseband spectra for each adjacent pair of up FMCW ramps;

combining real spectra from I-down frames with real baseband spectra from Q-down frames to form the pseudo-complex baseband spectra for each adjacent pair of down FMCW ramps;

converting each of the pseudo-complex baseband spectra to a power spectrum by taking a magnitude squared of each complex value in a sequence; and averaging the power spectrum.

* * * * *